United States Patent [19]
Kellett

[11] Patent Number: 5,678,346
[45] Date of Patent: Oct. 21, 1997

[54] MULTI-USE DECOY

[76] Inventor: Keith Craige Kellett, R.R. #1, Minden, Ontario, Canada, K0M 2K0

[21] Appl. No.: 653,398

[22] Filed: May 24, 1996

[51] Int. Cl.6 .................................................. A01M 31/06
[52] U.S. Cl. .................................. 43/2; 135/901; 280/30
[58] Field of Search ........................ 43/1, 2, 3; 135/901; 280/30

[56] References Cited

U.S. PATENT DOCUMENTS

| | | | |
|---|---|---|---|
| 261,910 | 8/1882 | Cochel | 43/3 |
| 2,501,517 | 3/1950 | Honald | 43/1 |
| 3,436,856 | 4/1969 | Miller | 43/3 |
| 4,581,837 | 4/1986 | Powlus | 43/1 |
| 4,738,045 | 4/1988 | Cardozo | 43/1 |
| 4,829,694 | 5/1989 | Oasheim | 43/1 |
| 5,075,999 | 12/1991 | Fredricks | 43/1 |
| 5,197,216 | 3/1993 | Norris | 43/1 |

Primary Examiner—Jeanne Elpel

[57] ABSTRACT

A bird decoy having more than one use is disclosed. In a first embodiment the decoy provides conveyance means for user supplies and when the user is situated in it, becomes a decoy which operates as a blind. In a second embodiment the decoy is adaptable to present the image of any one of three different body positions found in a flock of game birds.

9 Claims, 5 Drawing Sheets

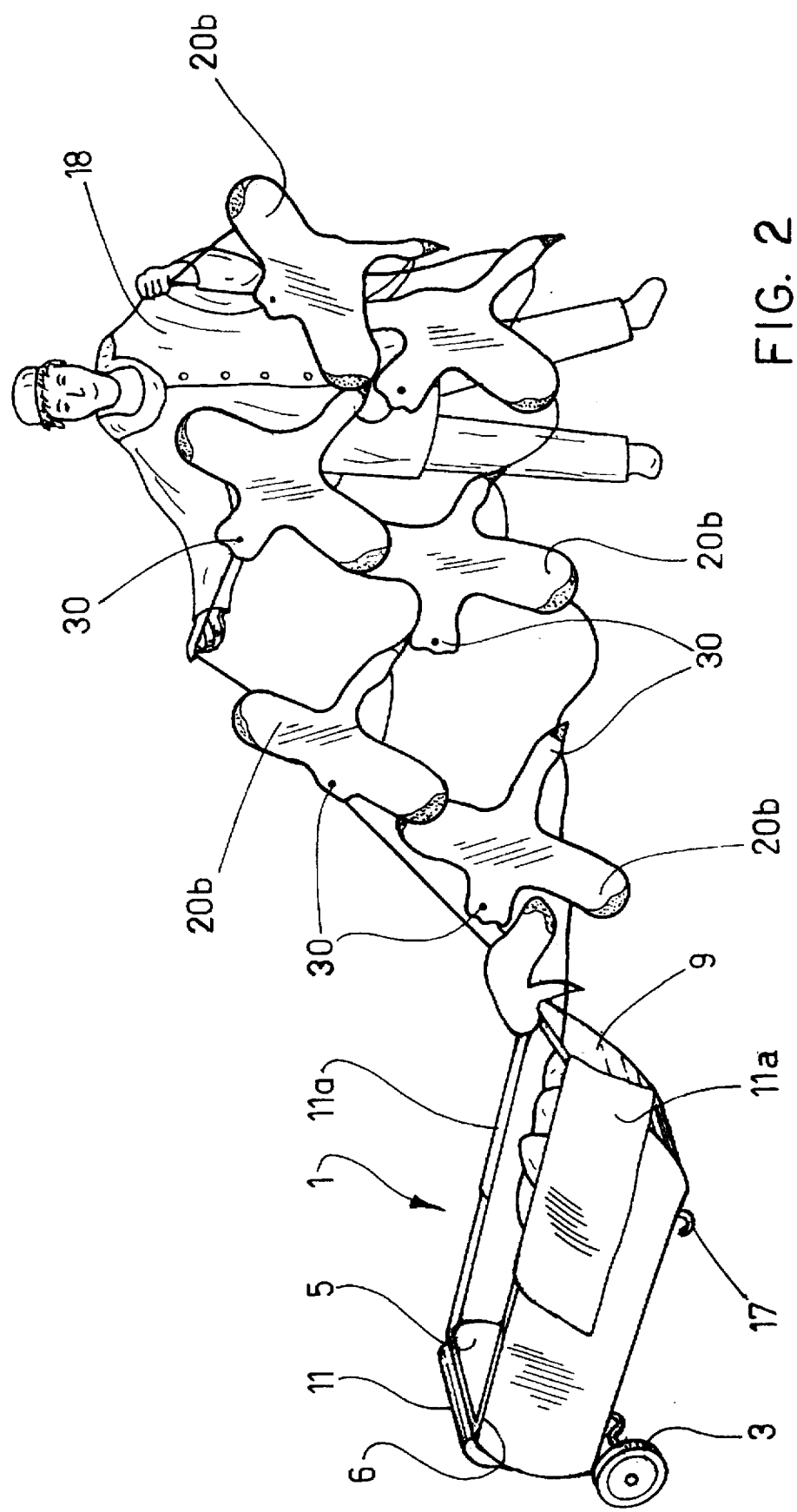

ns
5,678,346

MULTI-USE DECOY

FIELD OF THE INVENTION

The present invention relates generally to decoys, and in particular to a decoy having more than one use.

BACKGROUND OF THE INVENTION

Typical of decoys which can also act as blinds are U.S. Pat. No. 4,581,837 to Powlus and U.S. Pat. No. 5,075,999 to Fredericks. The body shells of both are substantively sized rigid structures adapted to enclose the users body, and egress in both for photography or discharging a gun is provided by means of the user opening at least one door prior to taking aim. Such decoy/blinds are disadvantageous with respect to portability, and with respect to tracking a subject as the users body is strictly oriented in one direction and the user must manipulate a door prior to clear access to his subject. In some cases, blinds can be collapsed down to become a convenient package for carrying, and when expanded provides coverage for the user. Prior art blinds such as U.S. Pat. No. 4,782,616 (Hambleton) provides a collapsible rotatable blind wherein the hunter or photographer can be seated during use, and which can be disassembled and packed into a pack frame. This blind however does not act as a decoy itself, and must be carried with the other user supplies. In other cases, the blind is not collapsible and must be carried along with other user supplies which can be a substantive burden for the user, especially if the user further desires to have as many decoys as possible at the same time. Various types of decoys having more than one use have been offered, such as U.S. Pat. No. 4,651,458 to Lanius which teaches modifying the stance of a decoy between that of a feeder and that of a sentry by changing the position of the neck.

SUMMARY OF THE INVENTION

Accordingly, there is a need for decoys which have more than one use, such as one which provides conveyance means for users supplies, i.e. food, decoys, cameras, guns, etc, and which, when the user arrives at a desired location, can be unloaded of its contents and quickly modified to become a blind suitable for enclosing and camouflaging the user, and which does not impede the user's visual tracking of a subject.

The present invention relates generally to a decoy which, after being wheeled to the desired habitat and emptied of contents, is adaptable to provide a rotatable blind substantially resembling a game bird in a sentry posture, in which the user, when in a seated position therein, forms a portion of the decoy and is thereby camouflaged without the loss of field of vision and freedom of movement.

A decoy according to the present invention provides convenient storage and transport for the goods of a user such as a camera, food, emergency kit, and various other items such as decoys and ammunition, to a desired location while on an excursion such as hunting or field studies. If the user is a hunter who also desires to have with him a number of decoys, the decoy of the present invention may be used with a flock formed of multi-mode decoys such as disclosed herein. When closed for transit, the decoy provides a single, compact, portable package easily pulled to a desired location by the user.

Accordingly, the present invention provides a bird decoy comprising a generally cylindrical, rigid shell having a first and second end, a first opening disposed on an upper surface thereof and a second opening disposed in an opposed lower surface thereof, the first opening extending substantially between the first and second ends, and the second opening disposed proximate the second end, the shell generally resembling the body of a bird and adapted to receive predetermined markings thereon; removable closure means adapted to close each of the first and second openings; rotatable support means adapted to be removably mounted on an exterior portion of the lower surface proximate the first end, for adapting the shell to provide rotatable seating means for a user to be disposed therein; an upper body garment and cap bearing the semblance of the head and neck of a game bird, adapted to be worn by a user, whereby when the user is seated in the shell, said garment means, said cap means, and the shell cooperate to provide a rotatable decoy apparatus adapted to resemble a game bird; and movement means releasibly disposed at opposite ends of the shell to facilitate the moving of the decoy from location to location.

The present invention further provides a multi-mode bird decoy particularly adapted for forming a flock, the bird decoy comprising means for representing the body and two wing portions of a bird, the means comprising a sheet of light-weight, flexible foamed plastic material bearing predetermined coloration on at least one surface; grommet means placed proximate the outer portion of each of the two wing portions and at each end of the body; and mounting means adapted for insertion through at least two of the grommet means to adapt the decoy into a plurality of predetermined positions. The bird decoy mounting means provides a predetermined position which is selected from the group of positions consisting of feeding, swimming, or flying.

BRIEF DESCRIPTION OF THE DRAWINGS

The invention will next be described by means of preferred embodiments, with reference to the accompanying drawings, in which:

FIG. 2 shows the user removing a flock of multi-mode decoys stored within the decoy;

DETAILED DESCRIPTION OF THE INVENTION

The present invention provides a user with a multi-use decoy apparatus which comprises a wheeled containment shell, an upper body garment and cap, and a rotatable support, and which provides space for the storage and carrying of goods such as cameras, ammunition, food, etc. When emptied of its contents, the containment shell, in collaboration with the upper body garment and cap, affords the user a game bird decoy in the form of a rotatable blind in which the user can comfortably sit and await the arrival of the birds with an unrestricted field of view.

Figure 1:
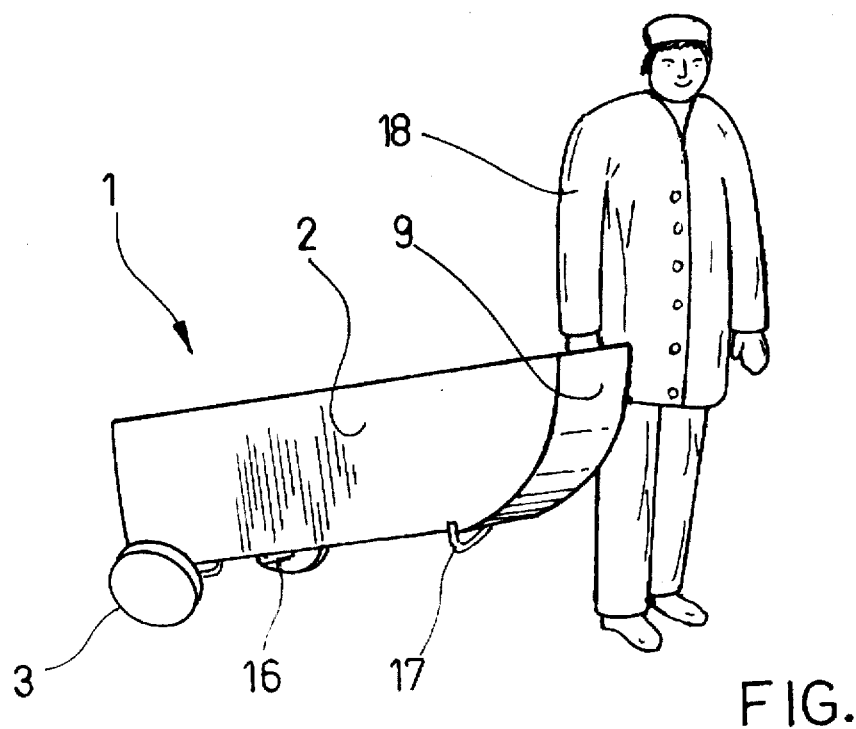
FIG. 1 shows an isometric view of a first embodiment of a decoy.
Figure 4:
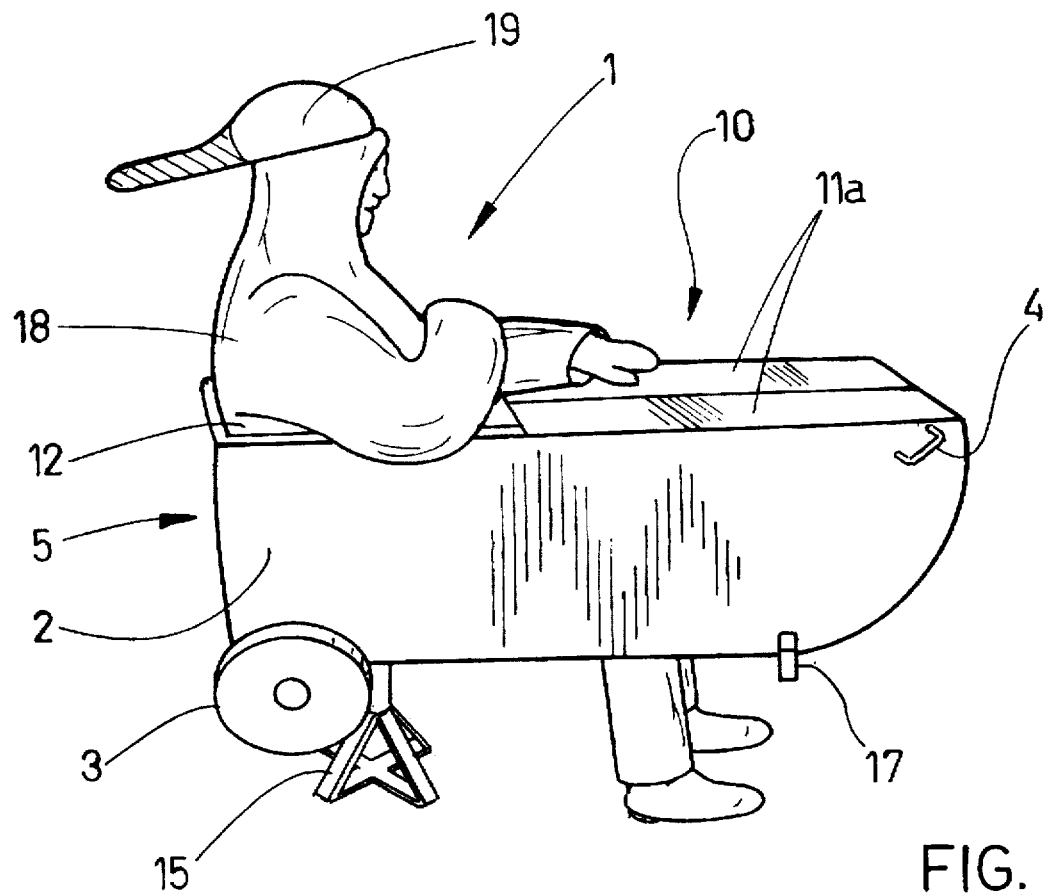
FIG. 4 shows the user both in and forming a part of a decoy.
Figure 3:
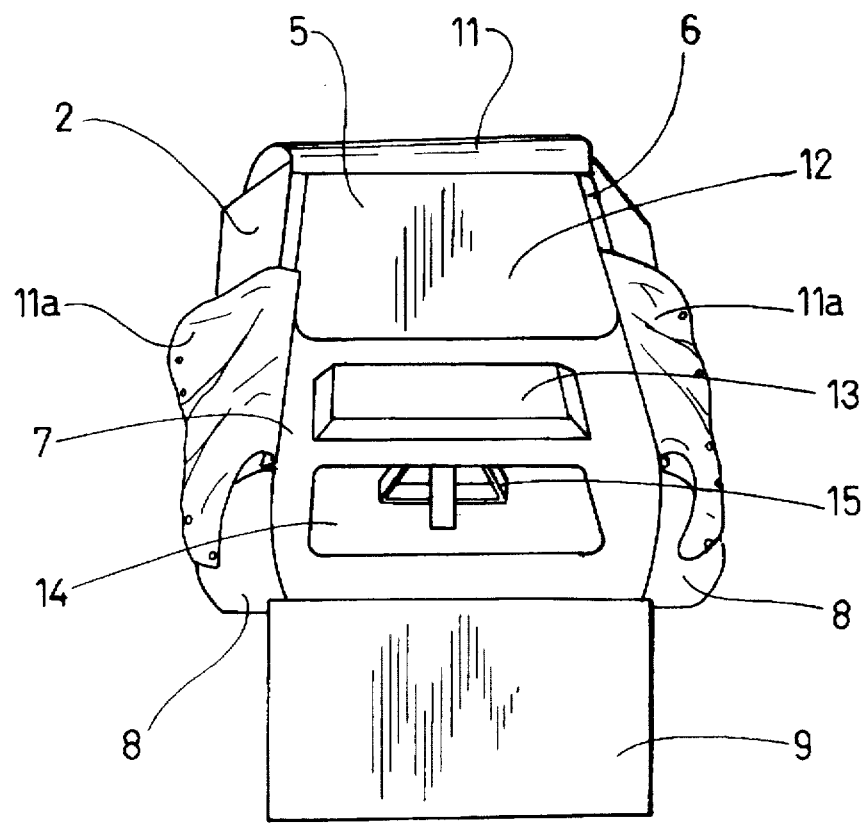
FIG. 3 shows a view of the decoy prior to the user entering it.

As shown in FIGS. 1 and 2, the decoy apparatus 1, when assembled for transportation, a portion of the decoy resembles a generally cylindrical containment shell or body 2 comprising an elongate tube portion having wheels 3 disposed at a lower end and a handle 4 at the other for handling and pulling. A lower end wall 5 terminates the shell 2 substantially normal to the axis thereof. The shell or body 2 has both an upper flattened wall 6 and a lower flattened wall or floor 7 extending the length of the shell. The shell 2 is further provided with a terminating upper end wall 8, which comprises a linear extension of the floor 7 curving upward and terminating at the upper wall 6. The wheels 3 and axles therefor are mounted by known means to the floor 7 adjacent the end wall 5 and are adapted to be readily removable. In this way, the user may choose from a selection of various wheel sizes and types, i.e. one of preference for the terrain in which he is going to use the decoy. The handle 4 is adapted to releasibly engage the body or shell 2 on either side as preferred by the user.

In a preferred embodiment, there is disposed in the end wall 8 a hinged door panel 9 which is adapted to swing down or away from the upper wall 6 to provide the user entrance and egress from the shell 2, and to latch closed adjacent the upper wall 6 when in use or in transit. The shell and end walls are formed of a substantially rigid material such as sheet aluminum, fibre-glass, plastic sheet or laminate, or similar type materials capable of providing light weight, substantial rigidity, corrosion and weather resistance, and can be fabricated from different pieces, or moulded.

The flat upper wall 6 comprises a lip around the perimeter of the upper surface and, in conjunction with an upper panel assembly 10, serves both as the top and as the main entrance. In a preferred embodiment the panel assembly 10 comprises multiple, detachably fixable fabric panels 11, 11a. The fabric is selected to be sturdy and water proof and can be a canvas or similar material. In this embodiment, the fabric panel 11, extends approximately one-third of the upper wall proximate the lower end, and covers an upper body opening 12. It is attached on three sides to the upper wall 6 and at on one side attaches to the two mating flap panels 11a. Two flap panels 11a cooperate to form the upper back portion 6 proximate the upper end. The flap panels 11a are detachably affixed along the outside edges thereof to the upper wall 6. This allows the user, when seated, to conveniently reach directly in front of them to reattach the flap panels 11a to each other, thus forming the upper back portion of the body of a game bird. The upper panel assembly 10 may be fabricated and deployed in a number of other alternate ways, such as a single sheet adapted to have a portion tucked underneath, or alternatively can comprise one or two substantially rigid panels. The upper panel assembly 10 is releasibly attachable to the upper wall 6, and the panels 11, 11a to each other and the upper wall 6, in known fashion using such means as grommet, snap ring, zipper, or Velcro™ type fasteners. The fastening means are preferably selected to be readily deployable by the user wearing gloves, such as during inclement or cold weather.

Disposed in the floor 7, proximate the end wall 8, is a floor panel 13 which covers a leg opening 14. The floor panel 13 can be comprised of either a fabric or rigid panel material and which is adapted to be removed. Whether formed of fabric or rigid material, the floor panel 13 can be further provided with padding and placed between the opening 14 and the end wall 5 where the user will be seated, and if formed of rigid material, further serves to reinforce the shell in this area, thus allowing for thinner shell material to be used, as this area is under the greatest stress during use.

Stored with the shell 2 is a light-weight, collapsible, rotatable stand 15 which is adapted to be extensible to a height proximate that of the user's knee, or can be provided in predetermined lengths. The upper portion of the stand is adapted to be releasibly attached in rotatable fashion to a mounting bracket 16 disposed on the floor exterior proximate a position forward of the end wall 5. This turning point is linearly displaceable along a track allowing it to be positioned substantially underneath the user when the user is seated in the shell 2 allowing the user to controllably rotate as desired during use. The stand can vary substantially in shape and the selected form is preferably stable on a wide variety of ground surfaces. The stand is further preferably adapted to present as large a bearing surface to the ground as possible, thus making it easier and more stable to use in soft ground. To that end, the stand may be provided with a disc detachably mountable on the base of the stand 15.

The handle 4 is releasibly engagable to the shell body, on either side of the shell 2 to allow for the handedness of the user, as are two U-shaped rests 17, when the decoy is for use in hunting. They can also be used to hold the weight of a camera when being used for photography, so that the user may rest his arms while waiting, and yet have immediate access to the camera when desired, with a minimum of movement. The rests 17 are adapted to releasibly engage the shell 2 exterior proximate the lower and upper ends, and somewhat above floor height, and is engagable of either side of the shell. The rests 17 can be installed as a part of the shell during manufacture, or supplied to the user with appropriate mounting hardware.

Comprising a portion of the decoy is an upper body garment 18 adapted to be worn by the user while occupying the decoy. The upper body garment 18 is in the form of a jacket with a detachable hood, and a cap portion 19. The upper body garment 18 has the appropriate colour scheme of the neck portions of a selected game bird. The visor of the cap 19 is adapted to point to the rear of the user when worn, and preferably provides a semblance of the head and beak of the selected game bird. The upper body garment 18 and cap 19 are further preferably adapted to be reversible so as to present the colouring of another game bird when reversed.

The containment shell 2, with the upper panel assembly 10, and the upper body garment 18 and cap 19, together present the outer semblance of the body of game bird of interest. They each can further be adapted to receive detachable plastic sheets or such like bearing the marking semblance of various species and types of game birds.

When the user has reached the desired location, the upper panel assembly 10 is opened or removed and the user's supplies are removed. If the user was hunting, they would place any decoys at this time, and if photographing, any off-set cameras and control lines. The user next removes from the shell 2 the collapsible stand 15 and engages it with the mounting bracket 16. The user then removes the floor panel 13 from the leg opening 14 disposed towards the end wall 8 and attaches the floor panel 13 to the shell 2 at a position over the mounting bracket 16. The stand 15 is extended and is releasibly attached to a predetermined point along the mounting bracket 16 disposed on the exterior face of the floor 7 and the shell 2 subsequently righted. The stand 15 is attached at a position relative to the centre of gravity of the user when occupying a seated position within the shell, with the users legs extending through the leg opening 14 and the users upper body extending through the upper opening 12. When righted, the door panel 9 projects downward and assists in keeping the shell in a horizontal position while the user enters. The user, wearing the upper body garment 18, then steps through the opening, takes a seated position, and draws up and secures the door panel 9 in its closed position. The user then reattaches the flap panels 11a to each other to seal the opening. The user being settled in position would then don the cap 19.

In an alternative embodiment, the flap panels 11a can be adapted extend past the upper wall 6 to a predetermined point down the side of the shell 2 to act as a camouflaging flap. The predeterminedly positioned rests 17, where the user can rest his camera or firearm, will thus be camouflaged by the flap, until such time as the user wishes to employ it. Since the flap will simply fold out of the way, a user can maintain a visual fix on their subject while retrieving a camera or firearm to an aiming position, even while turning if need be, thus significantly benefiting his speed and accuracy and with minimal visual intrusion, thus not startling his subjects.

A decoy of the present invention provides a multi-mode decoy adaptable to each of three distinct typical bird attitudes so that, when at the chosen spot of deployment, the user can make a final determination as to how many of the decoys will be used to represent those coming to join a flock, how many will be used to represent those of the flock feeding on the ground, and how many will be used to represent those of the flock floating or feeding on a nearby water surface. Thus, a user is conveniently able to pattern a flock of decoys to their best advantage according to the circumstances he finds in the field.

Figure 5:
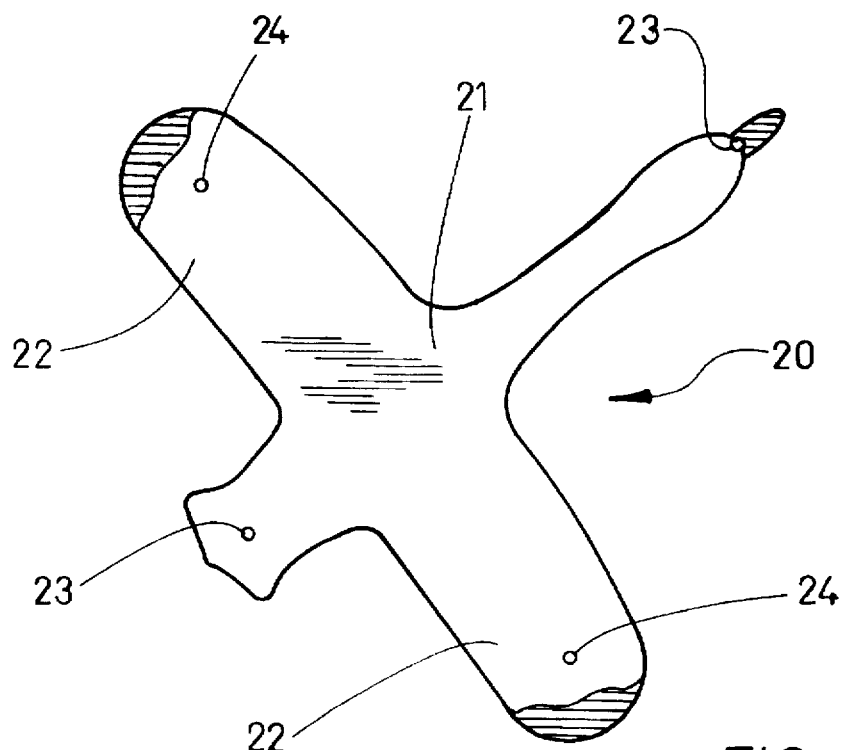
FIG. 5 shows a multi-mode decoy in plan view.

Shown in FIG. 5, is a general plan view of a multi-modal game bird decoy 20 with which the decoy 1 can be particularly advantageously used with. The decoy is preferentially formed of a light weight, semi-resilient, weather resistant plastic foam sheet that may be either cut, moulded, or punched out. When cut or punched, the edges of the sheet are treated to preserve their strength to prevent inadvertent tearing of the foam sheet. The foam material is further selected to provide at least one, and preferably a second, surface suitable to receive paint or other adaptive marking means by which the decoy is further adapted so as to resemble, for instance when used for hunting, one of the geese game birds. The marking means can comprise a sheet material bearing the coloration of the bird of interest and adapted to be releasibly laminated to the foam surface. Accordingly, both the foam material and the marking means are preferably chosen to be resistant to crazing or degradation when exposed to sunlight for long periods of time and to remain pliable in cold temperatures. The foam is very preferably water resistant and be in the range of ¼ to ½ inch in thickness. The thickness however can vary dependent upon the properties of the foam selected, as well as other factors, such as the type of skin the foam is formed with, and its properties. The invention can be effected for instance, with an air-cell polyethylene foam of 3/16 inch thickness. The shape of the decoy in outline from above, is selected to generally resemble that of a body shape and size of the predetermined bird of interest while it is in flight, that is, with the wings and the neck and tail substantially extended. The foam sheet can be further chosen to have a suitable base colour, such as white for snow geese or darker colored for mallard duck, Canada goose, etc., thus reducing the density of the adaptive marking required to be applied.

Opposite surfaces of the decoy can bear the markings and coloration of different birds, or the respective sexes of one bird of interest. Because of their size, weight, and adaptive resiliency, the multi-mode decoys 20 are well suited for use with the decoy 1 to form a decoy kit, since a substantial number of the multi-modal decoys 20 can be suitably stored, both at home and for travel, in the containment shell 2 of the decoy 1.

The multi-mode decoys 20 comprise a body portion 21 and two wing portions 22. The body portion 21 has grommets 23 provided adjacent the head and tail ends, and each wing portion 22 is provided adjacent the outer tip with a wing grommet 24. The decoy 20 can optionally comprise a third body grommet 23 disposed between the head and tail grommets 23. The grommets 23, 24 can be formed of corrosion resistant metal but are preferably formed of a plastic material providing comparable toughness, such as nylon. The grommets 23, 24 are formed to be preferably substantially flush with both sides of the plastic sheet forming the body 21 and wing portions 22, and the openings therefor are selected to be of convenient size, such as ¼ inch or smaller, but which can be larger. Alternatively, with the foam sheet further selected of a material adapted therefor, both the grommets 23, 24 and the openings therefor can be formed of the foam material of the body by thermal piercing means adapted to pierce a hole in the sheet and urge material radially to the outer edge thereof, and further adapted to form the moved material into a bevel-edged toroid, thereby forming the hole and grommet simultaneously. In another alternate embodiment, in order to increase the resistance of the foam to tearing and ripping, the foam further comprises a mesh laminate, or a core of a material such as fibre-glass, which preferably has a mesh size smaller the diameter of the grommet openings. Each decoy 20 can be further provided with a clear plastic sheet bearing the image of two ducks feet splayed in the landing position.

Figure 6:
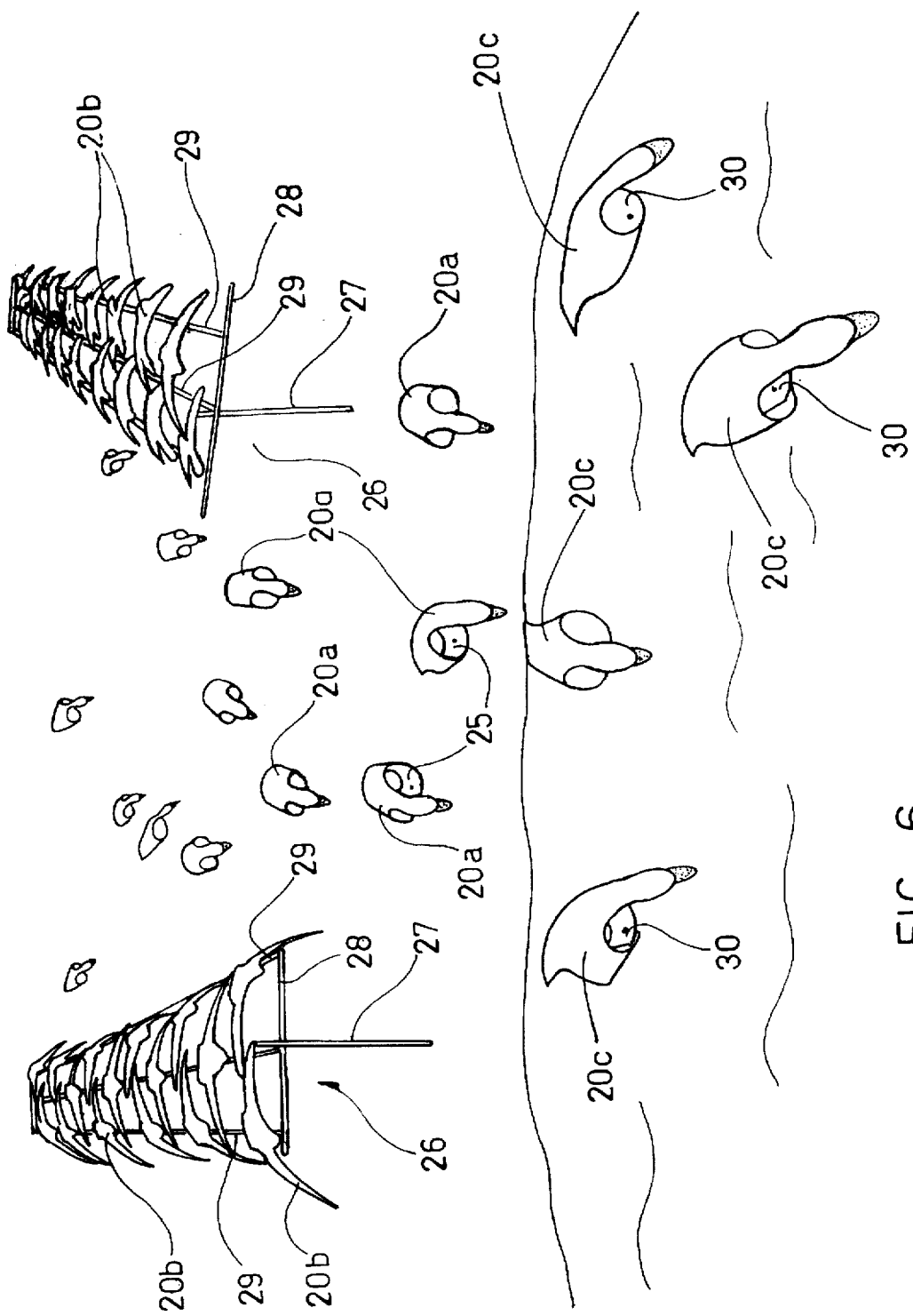
FIG. 6 shows a typical decoy arrangement afforded by multi-mode decoys of the present invention.

Shown in FIG. 6 are multi-mode decoys 20 adapted to each of three modes contemplated by the invention. In the first mode, the decoy 20a present a substantially three-dimensional semblance of a bird feeding or sitting on land (both positions referred to herein as feeding), when viewed from behind and above, such as the view a landing bird might have. This mode is accomplished by urging the respective wing-tips of the wing portions 22 under the body portion 21 until the two wing tip grommets 24 are in alignment, at which time a pin 25 is inserted therethrough and forced into the ground, thereby holding the body portion 21 in a substantially circular shape on the ground. The pin 25 can be formed of any convenient material such as a common nail, screw, golf T, or can be specially fabricated for the purpose. Alternatively, a long pin can be provided with a frictionally engaged washer to hold the body portion 21 in substantially circular at a distance above the ground. The tail and head portions of the body 21 are readily deformed into a downwardly turned position resembling a feeding bird and, because the plastic sheet of the body is semi-resilient, will stay in this position until urged into another, such as when being repacked for transit or storage, for instance, in the containment shell 2 of the decoy 1.

Figure 7:
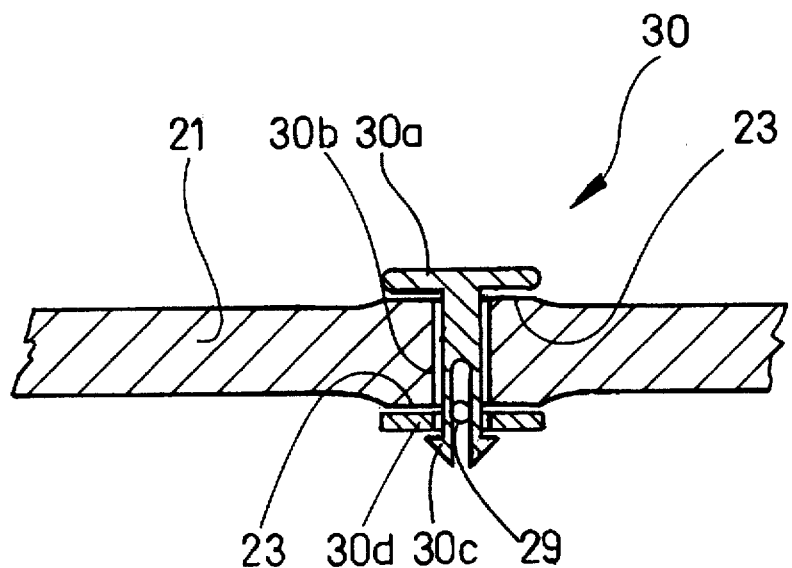
FIG. 7 shows a cross-sectional detail of a mounting clip according to one aspect of the multi-mode decoy.

As shown in FIG. 6, the second mode of use of the multi-mode decoys comprises that of the decoys 20b simulating the landing of a flock or portion thereof. Mounting supports 26, each comprise a set of two tubes which are adapted to rest in parallel fashion to each other and to releasibly lock at right angles to each other when working. The first tube 27 or shaft is adapted for insertion in the ground, and the second tube or cross-arm 28 has both the ends and the center thereof adapted to receive support cord 29. While two and three support cord 29 arrangements are shown, an arrangement with only one cord 29 is also possible. Further, the cord or cords 29, while preferably supported from the mounting supports 26, can be supported from many things, including bushes and trees on site. The decoy 20b, by way of mounting clips 30 shown in FIG. 7, is adapted at both the head and tail grommet 23 to releasibly engage a support cord 29, which can be formed of rope or wire or similar material. The mounting clip 30, as shown in detail in FIG. 7, is preferably fabricated from a resilient, weather resistant plastic material and comprises a main body 30a having two legs 30b which grip the support cord 29 therebetween. The legs 30b of the clip are preferably provided with locking barbs 30c which lock a locking washer 30d in place, which releasibly holds the cord 29 to the body of the decoy 20b.

A plurality of decoys 20b are thus attachable in staggered spaced relationship along each of two or three cords 29 such that at least one wing of the decoy can take support from an adjacent support cord 29. The cords 29 can also be spaced such the wings just droop. Various configurations of the decoy 20b are readily achievable using the same support, for instance, a wedge-shaped decoy flock can be formed when the support cords 29 are divergently supported, whereupon further decoys can be disposed in the opening of the V-shape by supporting them from the others by means of the grommets. Because the decoys 20b attached to the support cords 29 can reside in a close layered disposition to each other while stored, as for instance in the containment shell 2 of the decoy 1, and in linear disposition to each other when the cord 29 is extended, the decoys 20b need only be attached to the cords 29 at the first use. Thereafter the decoys 20b would only need to be removed from the cord 29 to replace damaged decoys 20b, or when the user desired to use some of them to increase the number of feeding decoys 20a or swimming decoys 20c, either in response to a new location, or to modify the feel or attractiveness of the decoy flock to a bird or flock flying by.

Figure 8:
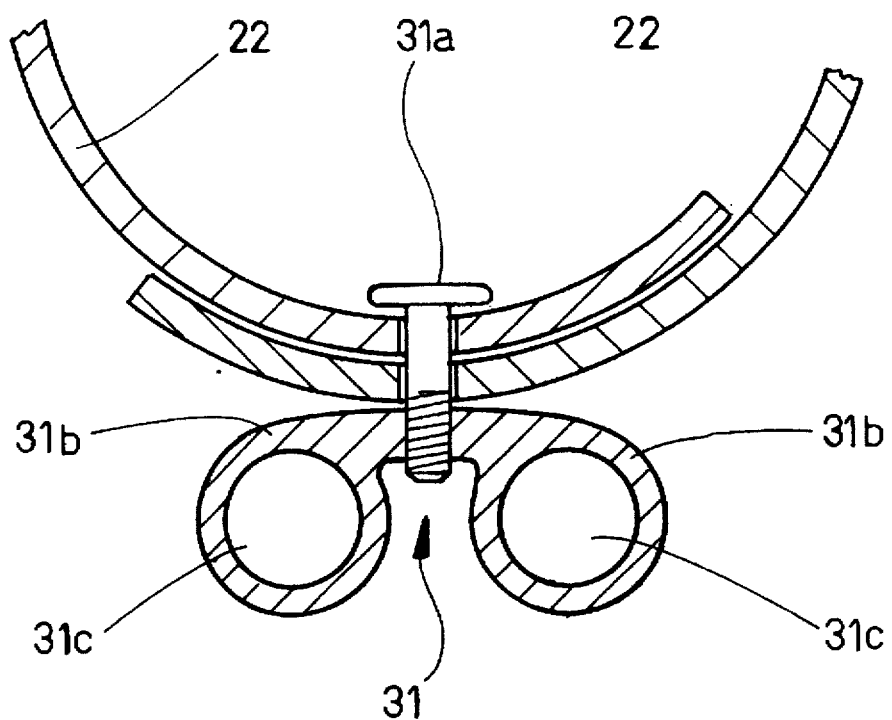
FIG. 8 shows a cross-sectional detail of a further mounting clip according to a further aspect of the multi-mode decoy.

The third mode of the multi-mode decoys comprises that wherein the decoy 20c is adapted to simulate a bird, such as a goose or duck, feeding or floating on a water surface. In this mode, the wing portions 22 are urged under the body portion 21 with the wing grommets 24 in alignment, and a water clip 31 is introduced. The clip 31 is adapted to hold the decoy 20c body in a substantially upright position while on the water and can comprise a bolt arrangement adapted to fasten ballast means, such as a swivel mounted bell sinker, to the decoy 20c. As shown in FIG. 8, when the decoy 20c is being used for hunting, the water clip 31 preferably comprises mounting bolt or stud 31a adapted to releasibly secure the wing portions 22 in position, and to removably affix to the overlapped wing portions 22, in a first embodiment, a saddle-bag type of ballast clip 31b having oppositely disposed loops 31c, each loop adapted to receive ballast, such as a shotgun shell, and offer non-damaging resistance to its withdrawal. While shown here as having the loops 31c disposed proximate the mounting bolt 31a, the clip 31b can be elongate in nature thereby providing the loops 31c at a distance somewhat below that of the mounting bolt 31a and can also be flexible in nature allowing a swivel type action to occur. The loops 31c are preferably formed to offer a ribbed or fingered inner surface with which to grip the shell exterior. The ballast clip 31b can be formed of a moulded rubber compound and is adapted to receive the stud or bolt 31a, which can be threaded. In an alternative embodiment, the ballast clip 31b can be formed from a strip of resilient plastic sheet material having a threaded opening proximate the middle thereof, and a loop 31c or opening disposed at either end, the opening formed to accept a shell and offer some resistance to its removal. To prevent decoys from moving to far adrift, it is contemplated that they will be affixed to a common cord anchored either at shore, or below the surface. Use of these ballast clips for the decoy 20c is advantageous since this reduces the weight a user must carry with them, yet allows ready use of this mode when desired. In those areas where the use of a shell in such fashion may be frowned upon, the shell can simply be replaced by a bolt or lead slug of appropriate shape.

The multi-mode decoy 20 shown herein is particularly adapted for use with the decoy 1 shown herein, and can be taken together as a decoy kit, thereby offering significant advantages over prior art decoy kits. Such a kit comprises the decoy 1 with the upper body garment and cap, and has stored therein a plurality of multi-mode decoys 20 and the hardware required to employ them in each of the three noted modes. Both the decoy 1 and the multi-mode decoy 20 can be used independently of each other when desired. A user can employ the decoy 1 with prior art decoys stored therein, and the multi-mode decoy 20 can of course be used without the decoy 1, such as with prior art blinds.

While there is shown and described the present preferred embodiments of the invention, it is to be understood that the invention is-not limited thereto but may be variously embodied to practice within the scope of the following claims.

I claim:

1. A bird decoy comprising:

a generally cylindrical, rigid shell having a first and second end, a first opening disposed on an upper surface thereof and a second opening disposed in an opposed lower surface thereof, said first opening extending substantially between said first and second ends, and said second opening disposed proximate said second end, said shell generally resembling the body of a bird and adapted to receive predetermined markings thereon;

removable closure means adapted to close each of said first and second openings;

rotatable support means adapted to be removably mounted on an exterior portion of said lower surface proximate said first end, for adapting said shell to provide rotatable seating means for a user to be disposed therein;

an upper body garment and cap bearing the semblance of the head and neck of a game bird, adapted to be worn by a user, whereby when the user is seated in said shell, said garment means, said cap means, and said shell cooperate to provide a rotatable decoy apparatus adapted to resemble a game bird; and movement means releasibly disposed at opposite ends of said shell to facilitate the moving of the decoy from location to location whereby said shell further provides storage for user goods during relocation.

2. A bird decoy according to claim 1, wherein said shell is formed of material selected from the group comprising fibre-glass, aluminum, plastic sheet, or plastic laminate.

3. A bird decoy according to claim 1, wherein said upper opening closure means comprises at least one fabric panel.

4. A bird decoy according to claim 1, wherein said lower opening closure means comprises a rigid panel.

5. A bird decoy according to claim 1, wherein said rotatable support means is further adapted for displacement longitudinally along said shell.

6. A bird decoy according to claim 1, wherein said second end further comprises a hinged door panel.

7. A bird decoy according to claim 1, wherein any of said shell, said upper body garment, and said cap further comprise releasable marking means bearing the coloration of a predetermined bird.

8. A bird decoy according to claim 1 wherein said upper body garment is adapted to sealing engage said first opening.

9. A bird decoy according to claim 1, wherein said movement means comprises wheels releasably mounted proximate said first end and a handle releasibly mounted proximate said second end.

* * * * *